Patented Dec. 10, 1929

1,738,590

UNITED STATES PATENT OFFICE

PAUL LANGENKAMP, OF DARMSTADT, GERMANY

STABLE PULVERIZED HAIR DYE

No Drawing. Application filed November 12, 1926. Serial No. 148,107.

Most commercial hair dyes consist, on the one hand, of organic dye bases or their derivatives, for example amino-phenol-sulpho-acid, phenylenediaminesulpho-acid and others, with an addition of an alkali or of ammonia, and, on the other hand, of an oxidizing agent.

Hydrogen peroxide solution or hydrogen peroxide carbamide, which is dissolved in water immediately before use, serves almost exclusively as oxidizing agents. The dyes come into commerce almost invariably in liquid form. In all cases the sale of the oxidizing agent takes place separately from that of the dye solution or dye mixture. The addition of the oxidizing agent can only be performed immediately before use on account of the great instability of the prepared hair dyes.

It has now been found that pulverulent, stable hair dyes can be prepared in a form ready for use after the addition of water, if the known dye bases are immediately mixed, in a dry condition, with a dry oxidizing agent and an anhydrous organic acid.

If, for example, 50 parts of dry barium peroxide are mixed with a dry mixture of 20 parts of paraphenylenediamine-sulpho-acid, ortho-amidophenol or paraaminediphenylaminemonosulphoacid and 30 parts of tartaric acid, a stable mixture is obtained, which gives, after mixing with water, a hair dye which is immediately ready for use. Other peroxides of the alkaline group, or of the alkaline earth group, can also be used in the place of barium peroxide, and other dry, water soluble acids, for example, as citric acid, can be used instead of tartaric acid. However the proportions of the constituents may be varied between wide limits. As a matter of fact any mixture containing representatives of each of the three mentioned classes (dry hair dyestuffs, dry oxidizing agents, dry organic acids) will practically give useful results.

Having thus described my invention, what I claim as new herein, and desire to secure by patent, is:

1. Pulverulent, stable hair dyes, ready for use after the addition of water, consisting in an intimate mixture of hair dyestuff bases in the dry state with dry barium peroxide and dry tartaric acid, the amount of the barium peroxide being sufficient to prevent acidity of the mixture.

2. Pulverulent, stable hair dyes, ready for use after the addition of water, consisting in an intimate mixture of a paratoluylenediamine compound in the dry state with dry barium peroxide and a dry organic acid, the amount of the barium peroxide being sufficient to prevent acidity of the mixture.

3. Pulverulent, stable hair dyes, ready for use after the addition of water, consisting in an intimate mixture of a paratoluylenediamine compound in the dry state with a dry alkaline oxidizing agent and dry tartaric acid, the amount of the oxidizing agent being sufficient to prevent acidity of the mixture.

4. Pulverulent, stable hair dyes, ready for use after the addition of water, consisting in an intimate mixture of a paratoluylenediamine compound in the dry state with dry barium peroxide and dry tartaric acid, the amount of the barium peroxide being sufficient to prevent acidity of the mixture.

5. Pulverulent, stable hair dyes, ready for use after the addition of water, consisting of an intimate mixture of hair dye-stuff bases in the dry state with a dry alkaline peroxide and a dry organic acid, the amount of the alkaline peroxide being sufficient to prevent acidity of the mixture.

In testimony whereof I have hereunto signed my name.

DR. PAUL LANGENKAMP.